A. A. WEST.
BATHTUB SEAT.
APPLICATION FILED MAY 29, 1920.
1,371,715. Patented Mar. 15, 1921.
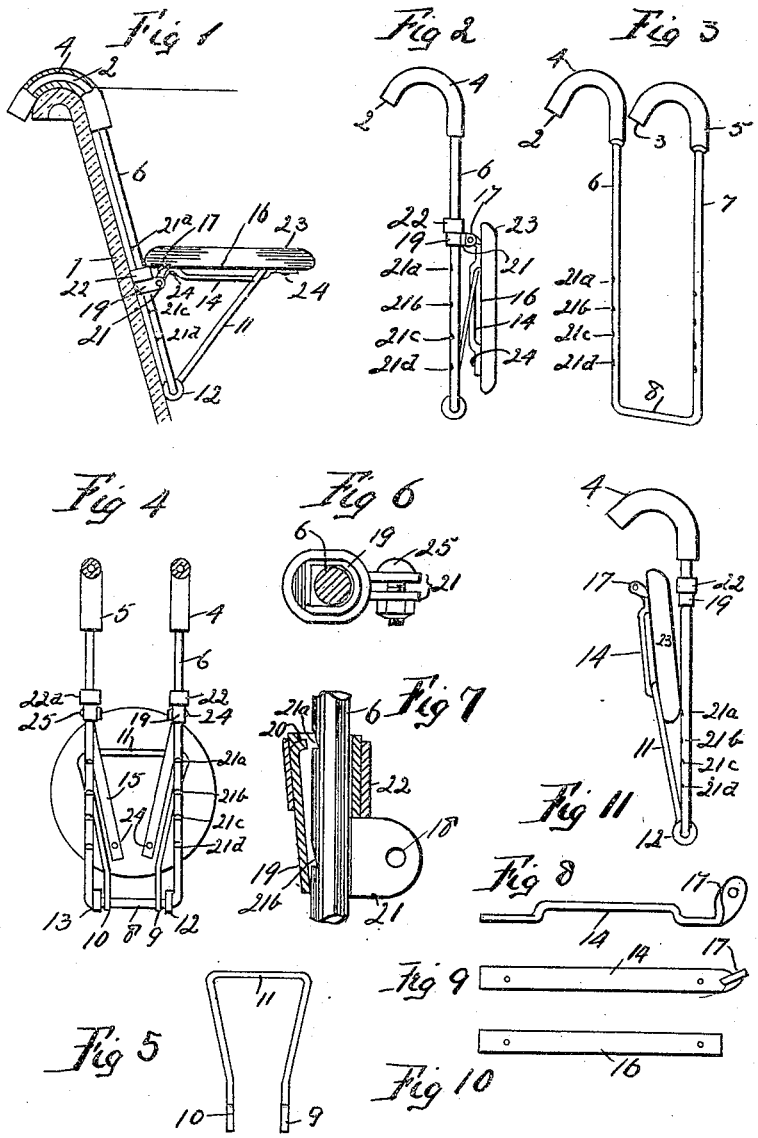
Inventor
Augustus Albert West
By Williamson

UNITED STATES PATENT OFFICE.

AUGUSTUS ALBERT WEST, OF PHILADELPHIA, PENNSYLVANIA.

BATHTUB-SEAT.

1,371,715. Specification of Letters Patent. Patented Mar. 15, 1921.

Application filed May 29, 1920. Serial No. 385,171.

*To all whom it may concern:*

Be it known that I, AUGUSTUS ALBERT WEST, a citizen of the United States, residing at Philadelphia, in the county of Philadelphia and State of Pennsylvania, have invented new and useful Improvements in Bathtub-Seats, of which the following is a specification.

The device, the subject of this invention relates to bathtub seats, but it is suitable as a detachable seat for automobiles, and such other use as a detachable, adjustable seat may be required, within its scope.

An object in view is to provide a seat which may be hung from the rim of the bathtub. All these functions and the construction which makes them possible, will be set forth as this specification progresses.

The following is what I consider the best means of carrying out this invention and the accompanying drawings form a part of the complete description, in which:—

Figure 1, shows a side view, showing seat in a position for occupancy, with fragmentary hook covering and fragmentary view of bathtub.

Fig. 2, is a side view, with seat folded back showing hanger arm and part of brace.

Fig. 3, is a perspective view of the hanger arms.

Fig. 4, is a bottom plan view, with hook ends of hanger arms broken away.

Fig. 5, is a plan view of brace.

Fig. 6, is an enlarged end view of slide lock.

Fig. 7, is an enlarged side section of slide lock.

Fig. 8, is an enlarged side view of brace holder.

Fig. 9, is an enlarged plan view of brace holder.

Fig. 10, is an enlarged plan view of flat runner.

Fig. 11, shows 14 unbolted, seat folded on back of hanger arms, for shipment.

Similar reference numbers indicate like parts in all of the figures where they appear.

Referring to the accompanying drawings by numeral, 1 indicates a bathtub of any usual or preferred structure over which the hook ends 2 and 3 are passed, said hooks having suitable casings 4 and 5 of rubber or other projecting material. Hooks 2 and 3 are bent or formed on the ends of hanger arms 6 and 7. Hanger arms 6 and 7 are preferably made of round steel rod, nickeled to prevent rusting, formed with a U bend or cross bar 8, acting as an axle for brace eyes 9 and 10 of the brace 11. Fig. 5, shows the preferred form of brace 11 in plan view, which I have made of round steel, rod, nickeled, with eyes 9 and 10, movable on axle 8. Rubber washers 12 and 13 of larger diameter than eyes 9 and 10 are placed on axle 8 to prevent metal members from marring the bathtub. 14 is a brace holder which allows a retained slidable movement of 11, one end 14 is bent over to form an axle support 17. 16 is a flat protector strip, screwed with 14 to the seat, forming with 14 a metal slideway for 11. 15 is similar to 14, except it has an opposite angle of bend at end. 15 has a flat metal companion strip, similar to 16. I prefer to use rubber washers on all screws in seat, to prevent water blisters forming on the enameled painted seat. A slide 19 consisting of a tube-like member, crimped or indented at 20, inwardly to engage with the notches 21$^a$, 21$^b$, 21$^c$ and 21$^d$ on 6. The extending portion 21 is provided with a hole 18. Slide 19 is movably attached to brace arm 14 by a bolt or rivet passing through the holes 18 and 17. 22 is a casing of rubber or other material on 19. 22$^a$ is a covering on slide 19$^a$. 23 is a round wood seat, white enameled. The wood screws are indicated by the numeral 24. I have found it desirable to flare the hook ends 2 and 3 to increase their spread from the hanger arms 6 and 7. Slide 19 can be a two piece casting with a pin serving at 20 to make the locking means in the hanger arm notches. 14 and 15 can be metal castings with names and numbers cast on outside. I have found it desirable to place notches in hanger arms on side nearest the bathtub, and place the slides 10 and 19$^a$ below the level of the seat out of the way of user of the device. A strong structural feature is found by my placing the brace member 11 near the front of the seat, making a strong brace, and inducing a firm locking weight pressure on the locking slide 19 and 19$^a$, I especially direct attention to this form of suspension. The seat in use does not easily drop out of locked position, accidentally, but by manually raising the seat, it is easily slid up or down, locked into position, or folded up. My device may be used on bathtubs of various angles, keeping seat level, by sliding seat up or down. Shipment packing is further facilitated, in reference to small space, by removing the bolts that connect 14 and 15 to slide locks 19 and 19ª and folding seat on the opposite side of hanger arms. I have also found that either slide lock will hold the seat in position, should other slide not lock, but I prefer to make both slide locks 19 and 19ª locking means. 25 and 26 are bolts, used as axles.

Modifications may be made within the scope of the appended claims without departing from the principles or sacrificing the advantages of my invention.

Having carefully and fully described my invention, what I claim and desire to secure by Letters Patent is:

1. A bathtub seat comprising a supporting member formed with a pair of hooks and a cross bar, said supporting member having notches therein, a seat, brace holders secured to said seat, a supporting member formed from one end of each of said holders, slides journaled about said supports and slidably mounted on the supporting member, means carried by said slides for engaging the notches to lock the slides in different adjusted positions and a brace journaled on the supporting member and slidably mounted in the brace holder.

2. A bathtub seat comprising a supporting member formed with a pair of hooks and a cross bar, said supporting member having notches therein, a seat, brace holders secured to said seat, a supporting member formed from one end of each of said holders, slides journaled about said supports and slidably mounted on the supporting member, means carried by said slides for engaging the notches to lock the slides in different adjusted positions, and a substantially U shaped brace having eyes for journaling the same upon the cross bar on the supporting member and slidably connected in the brace holder.

3. A bathtub seat including a seat member, a pair of flat strips, a pair of holding members coacting with the flat strips and means passing through the holding member and its coacting flat strip for securing them to the seat member.

In testimony whereof, I have hereunto affixed my signature.

AUGUSTUS ALBERT WEST.